Jan. 1, 1935.  F. TOLKIEN  1,986,084
CONTROLLING MEANS FOR DOUBLE ACTING RECIPROCATING ENGINES WITHOUT FLYWHEEL
Filed Aug. 8, 1932  12 Sheets-Sheet 1

F. Tolkien,
INVENTOR

By Marks & Clark
Attys.

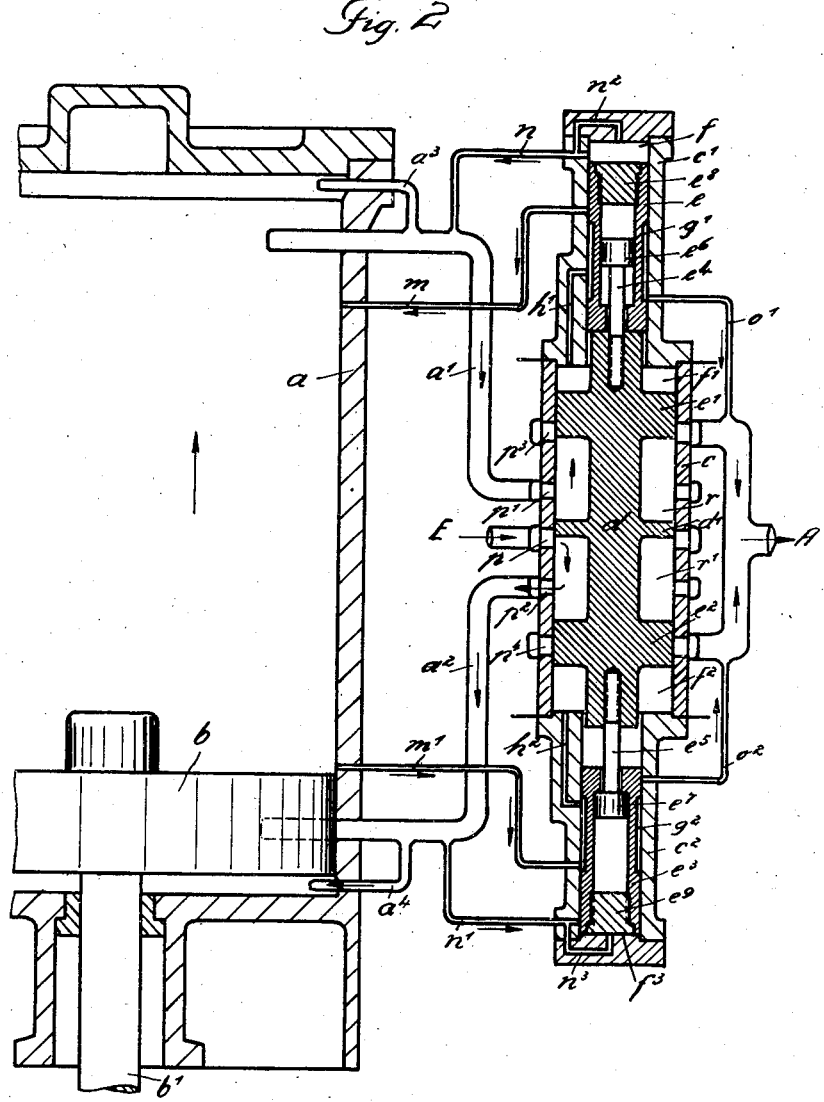

Jan. 1, 1935.   F. TOLKIEN   1,986,084
CONTROLLING MEANS FOR DOUBLE ACTING RECIPROCATING ENGINES WITHOUT FLYWHEEL
Filed Aug. 8, 1932   12 Sheets-Sheet 3
Fig. 2ª.
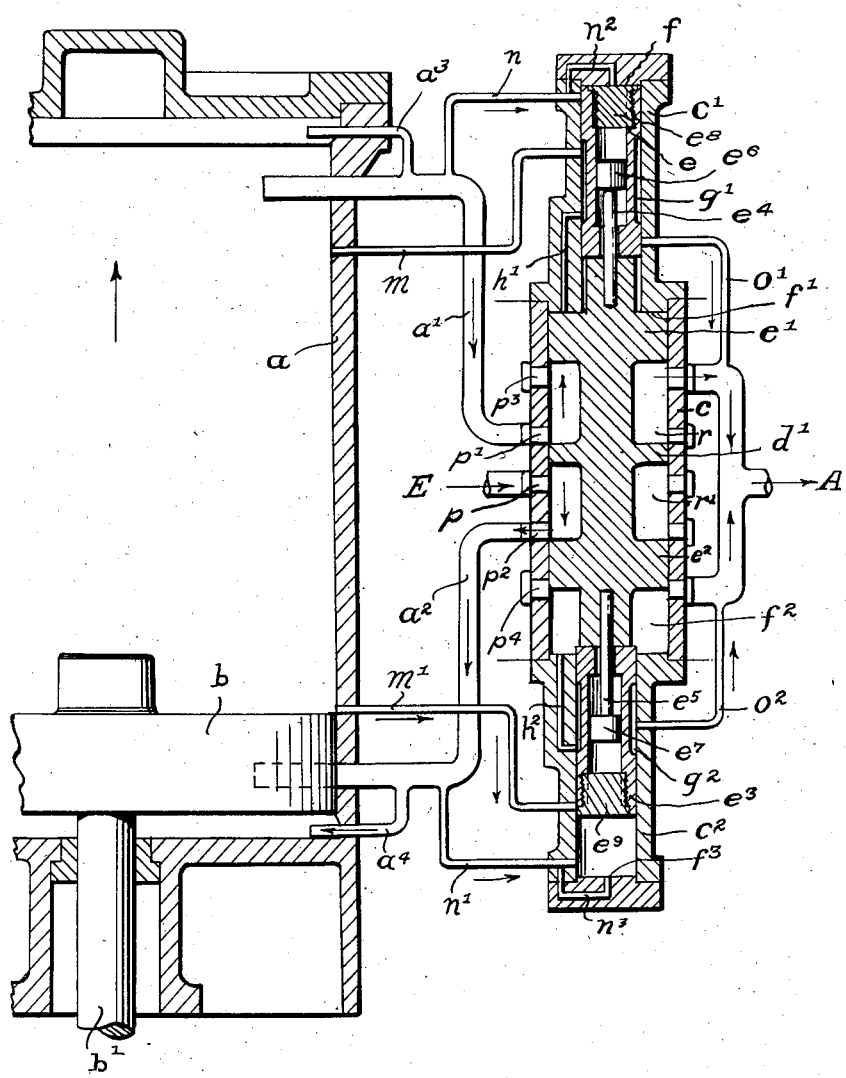
INVENTOR.
F. Tolkien
By Glascock Downing & Seebold
ATTORNEYS.

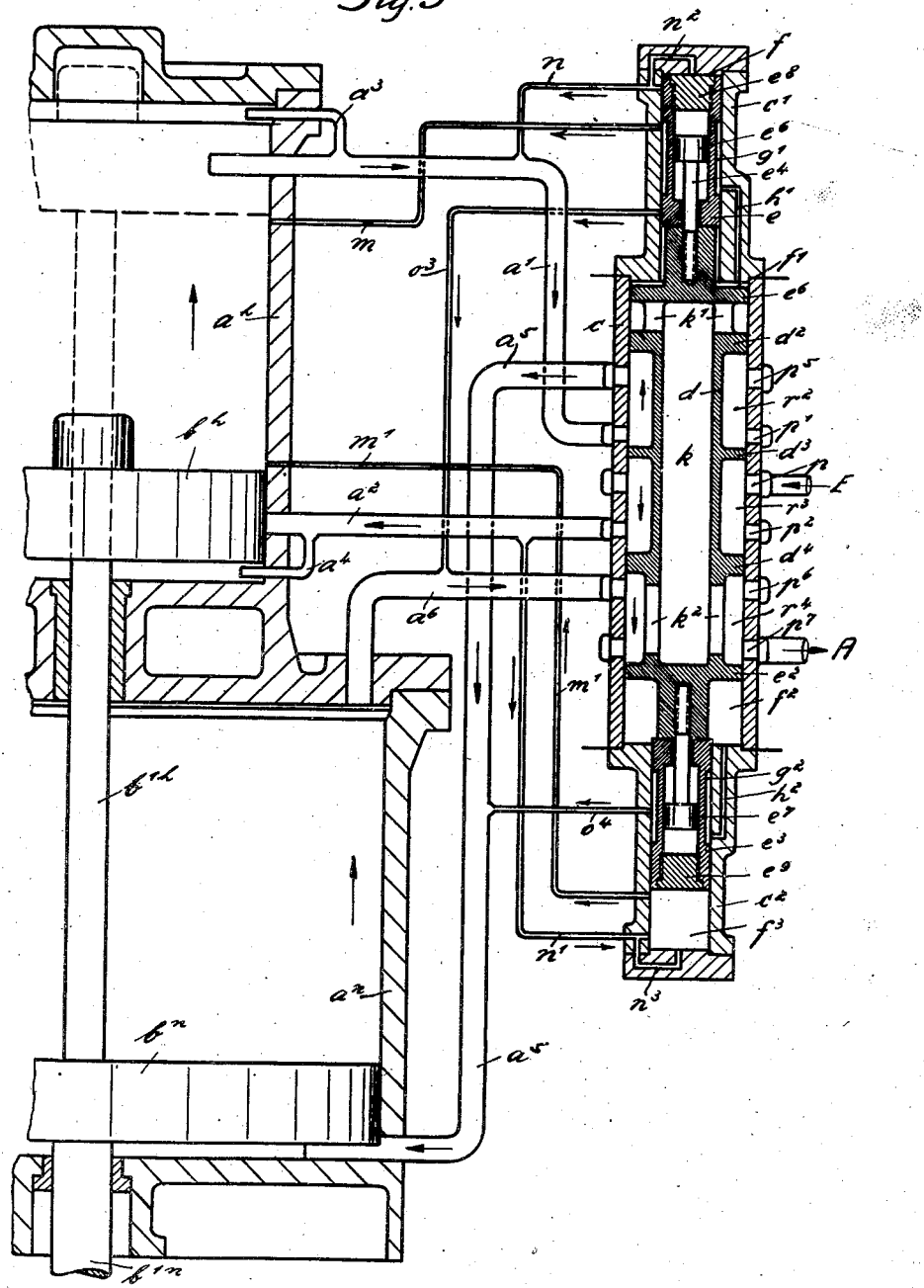

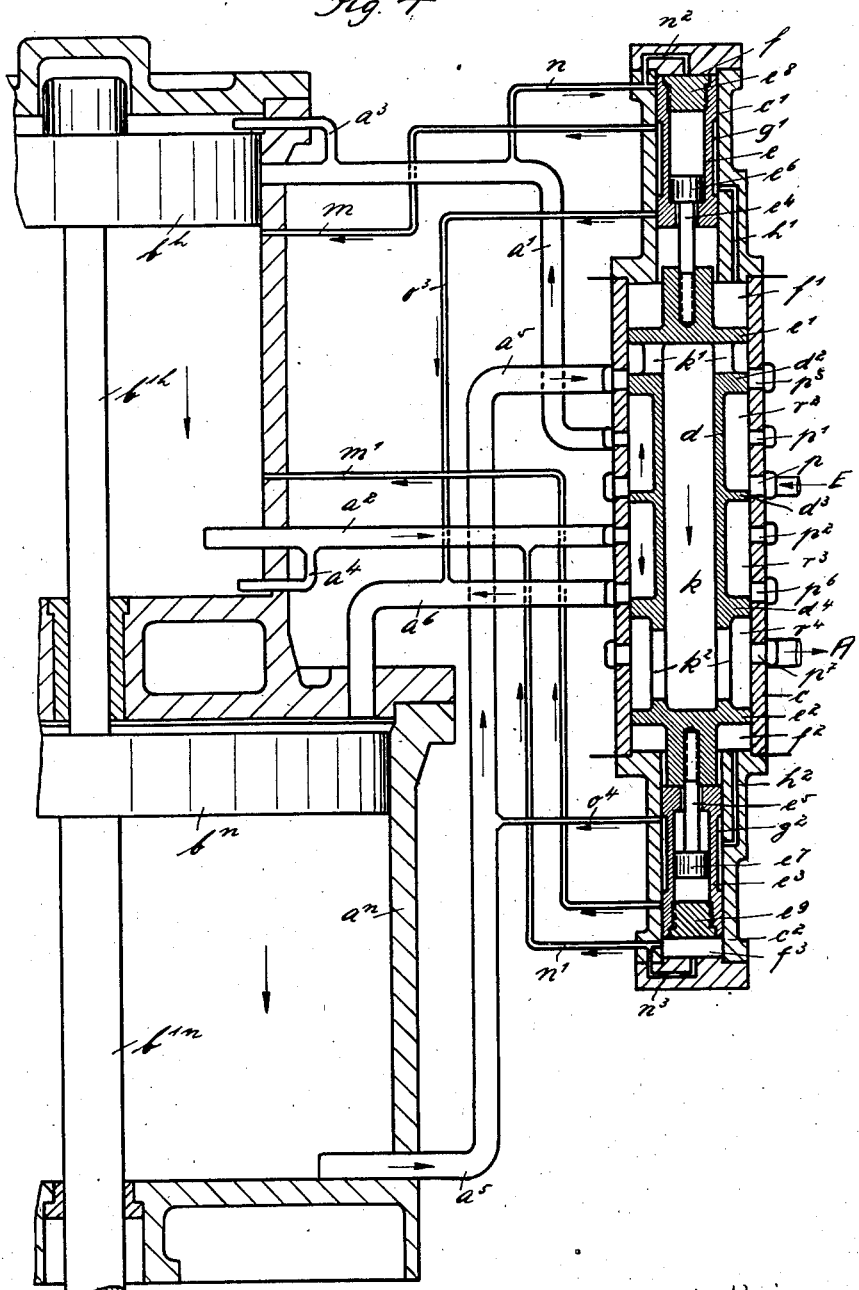

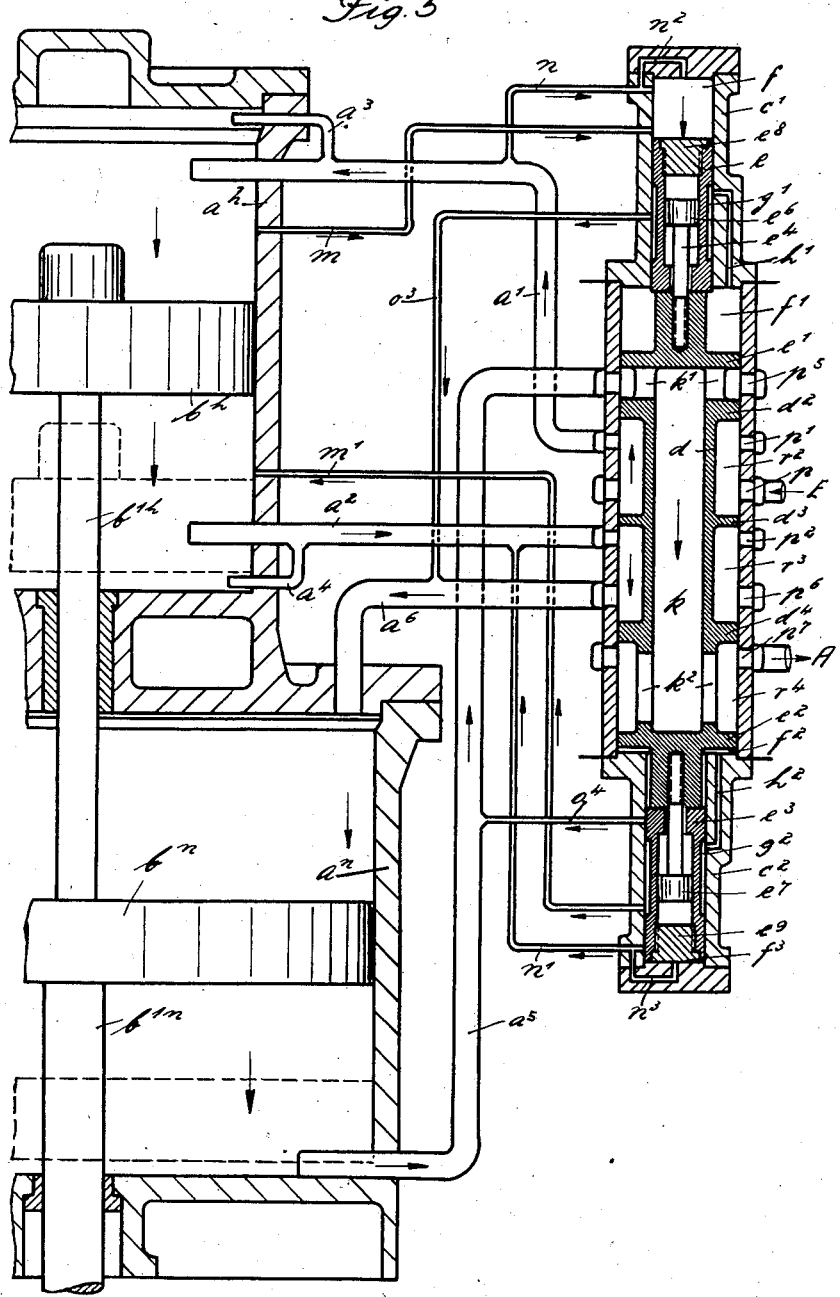

Jan. 1, 1935.   F. TOLKIEN   1,986,084
CONTROLLING MEANS FOR DOUBLE ACTING RECIPROCATING ENGINES WITHOUT FLYWHEEL
Filed Aug. 8, 1932   12 Sheets-Sheet 7

F. Tolkien
INVENTOR
By: Marks & Clerk
Attys.

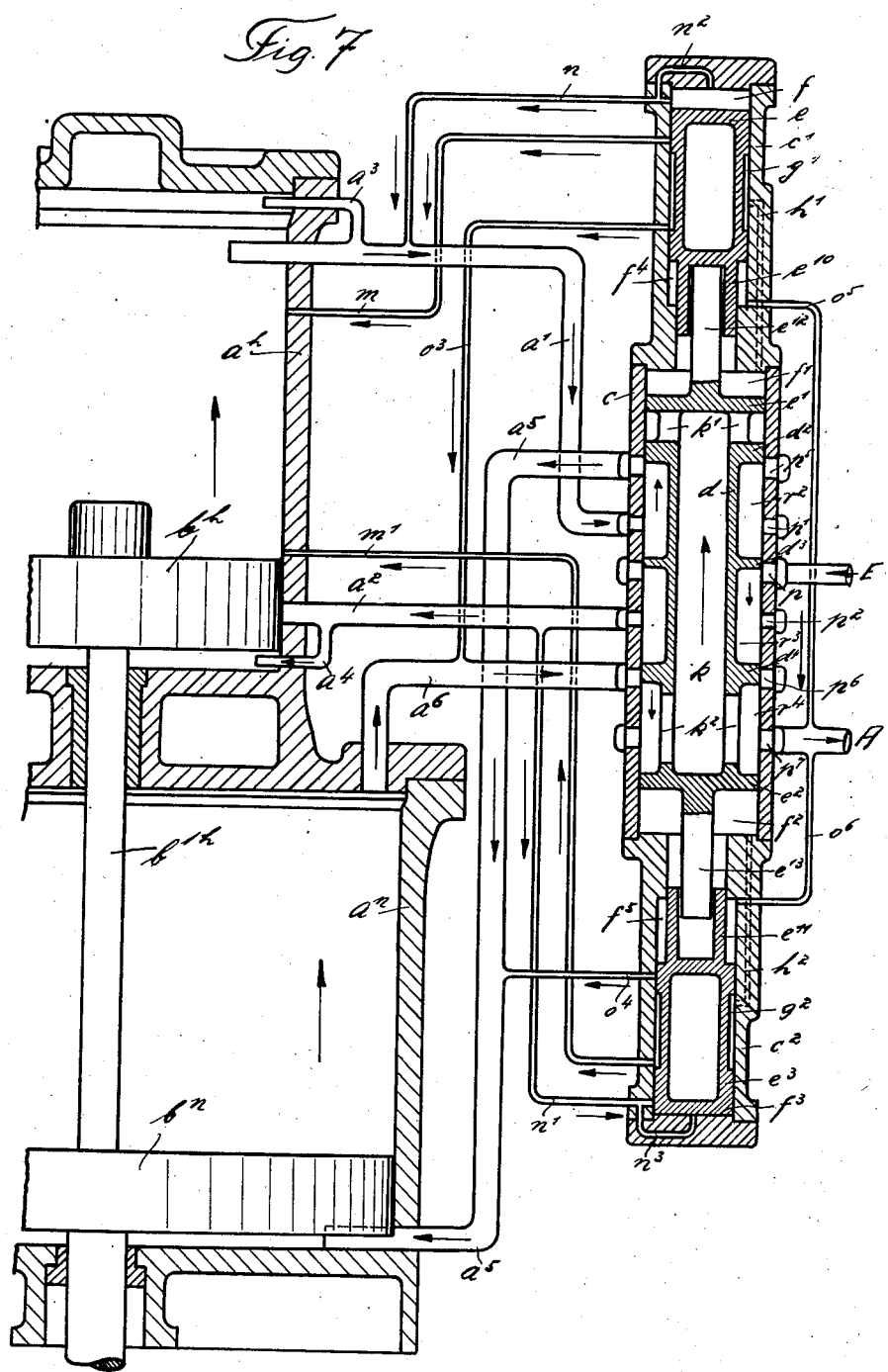

Jan. 1, 1935.  F. TOLKIEN  1,986,084
CONTROLLING MEANS FOR DOUBLE ACTING RECIPROCATING ENGINES WITHOUT FLYWHEEL
Filed Aug. 8, 1932   12 Sheets-Sheet 9
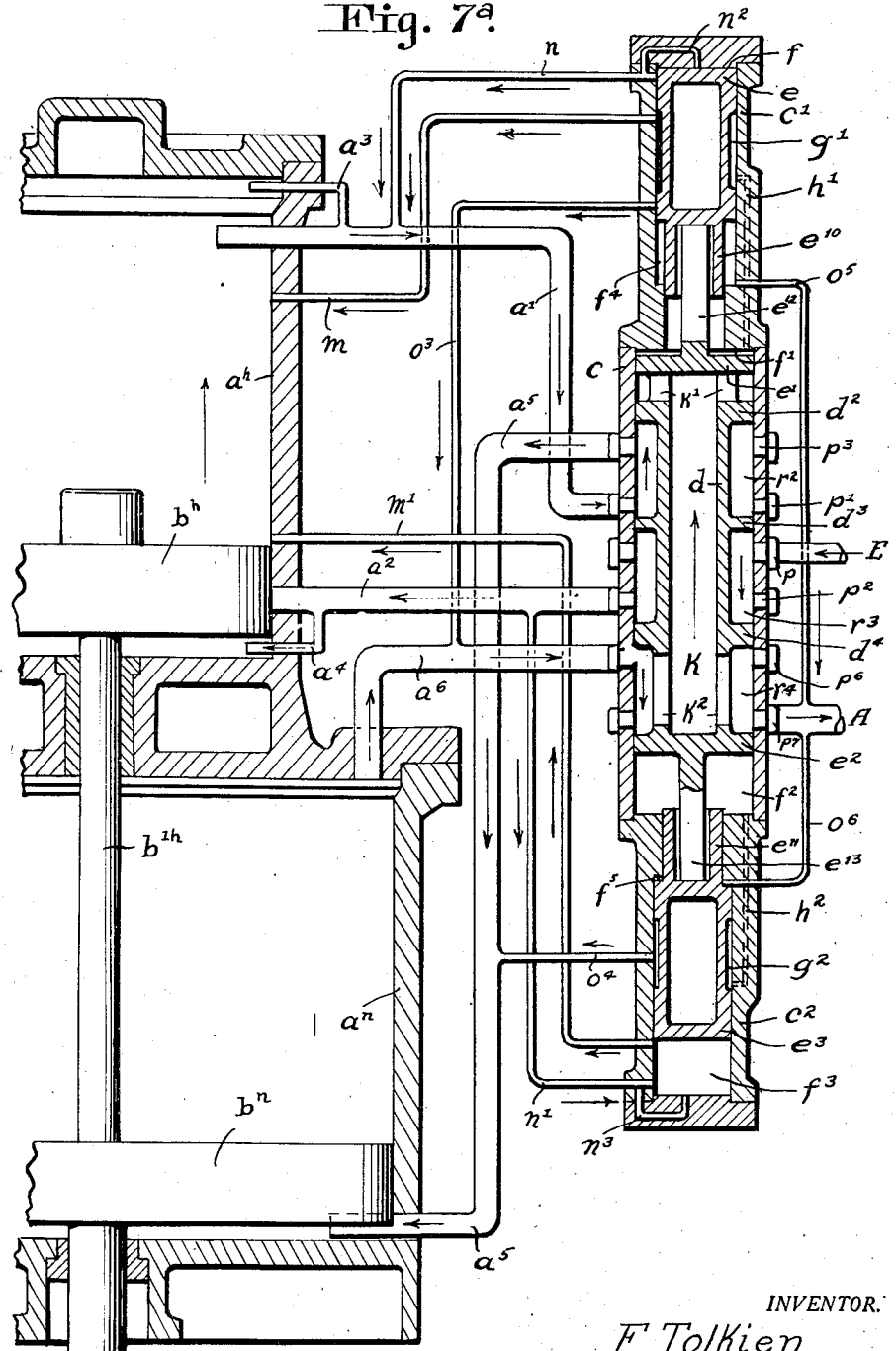
Fig. 7ª.
INVENTOR.
F. Tolkien
By Glascock Downing & Seebold
ATTORNEYS.

Jan. 1, 1935. F. TOLKIEN 1,986,084
CONTROLLING MEANS FOR DOUBLE ACTING RECIPROCATING ENGINES WITHOUT FLYWHEEL
Filed Aug. 8, 1932 12 Sheets-Sheet 10

F. Tolkien
INVENTOR

By Marks & Clerk
Attys.

Jan. 1, 1935. F. TOLKIEN 1,986,084
CONTROLLING MEANS FOR DOUBLE ACTING RECIPROCATING ENGINES WITHOUT FLYWHEEL
Filed Aug. 8, 1932 12 Sheets-Sheet 12

INVENTOR.
F. Tolkien
By Glascock Downing & Seebold
ATTORNEYS.

Patented Jan. 1, 1935

1,986,084

UNITED STATES PATENT OFFICE 1,986,084

CONTROLLING MEANS FOR DOUBLE-ACTING RECIPROCATING ENGINES WITHOUT FLYWHEEL

Fritz Tolkien, Hanover, Germany

Application August 8, 1932, Serial No. 627,984
In Austria June 30, 1932

5 Claims. (Cl. 121—152)

For double-acting reciprocating engines without flywheel controlling means have already been proposed, in which the controlling slide valve is moved by means of two differential pistons provided at its two ends with steam as the driving medium, the arrangement being such that for initiating the motion of the slide valve steam from the cylinder is caused to act on the larger differential piston by being admitted to the corresponding chamber of the valve gear. During the motion of the slide valve which then commences, the steam inlet into this valve chamber belonging to the larger differential piston is closed by the adjoining smaller differential piston, this cutting off of the supply of driving medium taking place before the valve has reached its middle position. Consequently, when the pressure of the steam withdrawn from the cylinder is low, the valve may easily come to rest in its middle position, which would result in an unintentional stopping of the flywheel-less reciprocating engine. This is all the more likely to occur if, when starting up the engine, the valve chambers are still cold, so that through condensation losses or owing to leakages the pressure drops to such an extent that the reversal by expansion of the imprisoned driving medium cannot take place. Owing to the symmetrical construction of the slide valve and the arrangement of passages necessitated thereby, it is not possible to maintain the connection of the larger chamber which initiates the valve motion with the power cylinder till after the valve has passed the middle position; for this longer connection would result on the other side of the valve in an oppositely acting premature admission to the larger differential piston at that end.

According to the invention this disadvantage of the hitherto known floating valve gears with differential pistons at both ends is overcome by the smaller differential piston at either end not being connected with the slide valve in a rigid manner as heretofore but being made as an independent auxiliary slide valve, the motion of which is produced either by the slide valve striking against it or by driving medium acting on it or by both arrangements. By this means the auxiliary slide valve can be caused to remain stationary on whichever is the admission side of the slide valve, that is to say, to allow the steam to continue to enter into the corresponding larger reversing chamber until the slide valve has moved beyond the middle position, whereby a reversal of the steam inlet to the cylinder of the engine is ensured.

In order to ensure in all circumstances the reversal of the floating slide valve under consideration, according to the invention the larger valve chamber in which there is no admission is connected during the motion of the slide valve by means of the adjacent auxiliary valve which is displaced by the slide valve to the exhaust or to a space at a lower pressure, so that in it no compression of the steam remaining in this chamber, which would arrest or interrupt the valve motion, can occur.

The accompanying drawings illustrate diagrammatically various constructional examples of the invention as applied to different kinds of reciprocating engines having no flywheels.

In Fig. 1 the main valve is shown in one of its end positions.

Fig. 2 shows the same constructional form, the main valve having passed the middle position and Fig. 2a shows the main valve in its other end position.

Fig. 3 shows a constructional form of the invention as applied to a double-acting two-cylinder compound tandem engine. The valve gear is shown in its upper end position.

Fig. 4 shows the same constructional form after the main valve has passed its middle position.

Fig. 5 illustrates the completion of the reversal and shows the valve system in the opposite end position to that shown in Fig. 3.

Fig. 7 shows the constructional form of Fig. 6, with the main slide valve just after it has passed the middle position and Fig. 7a shows the main valve in its other end position.

Figure 1:
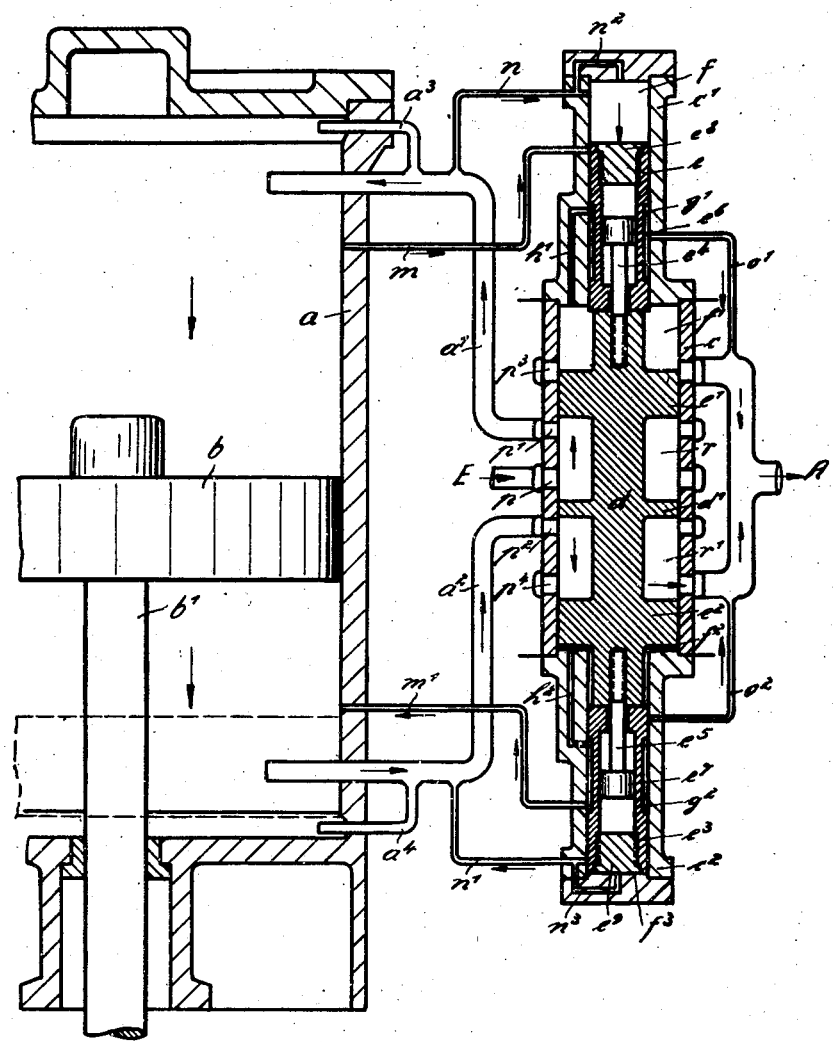
Fig. 1 shows the invention as applied to a double-acting single-cylinder engine, the auxiliary slide valves being drag valves.

In Figs. 1 and 2 $a$ represents the power cylinder of a double-acting single-cylinder engine, in which the power piston $b$ with the piston rod $b^1$ slides. The valve casing $c$ has its steam inlet at E and its exhaust at A. For connecting the valve casing $c$ with the power cylinder $a$ pipes $a^1$ and $a^2$ are provided, which open into the power cylinder at some distance from the cylinder covers and have branch passages $a^3$ and $a^4$ which have a smaller cross-section than the pipes $a^1$ and $a^2$ and open into the power cylinder immediately in front of the cylinder covers. This arrangement and division of each steam passage results in a known manner in a compression and a gentle arrival of the piston in the dead centre.

In the valve casing $c$ is the main slide valve $d$ which is composed of three pistons, the controlling piston $d^1$ in the middle and the driving pistons $e^1$, $e^2$ at the two ends, so that between the pistons $e^1$ and $d^1$ an annular space $r$ is formed and between the piston $d^1$ and $e^2$ an annular space $r^1$.

For connecting the various steam inlets and outlets the valve casing $c$ is provided with a number of ports, which with the exception of the connecting openings are closed in a steamtight manner or are covered as shown. The main steam supply pipe E is connected to the port $p$, the upwardly extending steam passage $a^1$ to the port $p^1$ and the corresponding downwardly extending steam passage $a^2$ to the port $p^2$. The forked exhaust passage A is connected at the top to a port $p^3$ and at the bottom to a port $p^4$.

At the top and bottom of the valve casing $c$ there are disposed auxiliary casings $c^1$ and $c^2$ which are of smaller cross-section and in which according to the invention the auxiliary slide valves $e$ and $e^3$ work. These auxiliary slide valves are hollow and their cavities are closed in a steamtight manner towards the outside, that is to say, at the ends remote from the ends of the main slide valve $d$ by threaded plugs $e^8$ and $e^9$ respectively. In the ends of the main slide valve $d$ driving rods $e^4$ and $e^5$ are screwed, which extend into the cavities of the auxiliary slide valves $e$, $e^3$ where they are provided with heads $e^6$ and $e^7$ respectively, which act as driving members. These heads and the driving rods $e^4$, $e^5$ are guided in such a manner in the auxiliary slide valves $e$, $e^3$ or are so constructed that the driving medium can enter the cavity in the auxiliary slide valves and fill them.

On the outside of each auxiliary slide valve $e$, $e^3$ is a circumferential groove $g^1$ and $g^2$ respectively, which intermittently communicate with the venting pasages $o^1$ and $o^2$ which lead to the forked exhaust passage A.

The working spaces of the auxiliary slide valves $e$ and $e^3$ are marked $f$ (at the top) and $f^3$ (at the bottom) while the valve chambers of the driving pistons $e^1$ and $e^2$ of the main slide valve are marked $f^1$ (at the top) and $f^2$ (at the bottom). To the working spaces $f$, $f^3$ of the auxiliary slide valve lying in the auxiliary slide valve casings $c^1$ and $c^2$ are connected pipes $n$, $n^1$ which are branched off from the steam pipes $a^1$, $a^2$ and are provided with branch passages $n^2$, $n^3$ of smaller cross-section which open into the casing covers.

Bores $h^1$ and $h^2$ open into the valve chambers $f^1$ and $f^2$ of the main valve pistons $e^1$, $e^2$, which bores are disposed in the auxiliary valve casings $c^1$, $c^2$ and are in permanent communication at their other end with the circumferential grooves $g^1$ and $g^2$ of the auxiliary slide valves. These circumferential grooves $g^1$ and $g^2$ can also be put into communication with pipes $m$, $m^1$ which communicate with the power cylinder $a$, into which they open at such a distance from the cylinder covers that the power piston $b$ when approaching its two dead centre positions uncovers them after having passed over them (see Fig. 2).

The valve arrangement just described operates in the following manner:

In Fig. 1 the power piston $b$ has in its downward movement passed just beyond the middle of the cylinder; the main slide valve $d$ with the two auxiliary slide valves $e$, $e^3$ is in its bottom extreme position. Live steam flows at E through the port $p$ into the circumferential space $r$ of the slide valve and thence through the port $p^1$ and the steam passage $a^1$ into the power cylinder, so that it drives the piston $b$ further downwards.

Through the pipe $n$ which branches off from the pipe $a^1$ the live steam passes into the working space $f$ of the auxiliary slide valve $e$ and acts on the latter, which is supported on the main slide valve $d$, so that the slide valves $d$, $e$ and $e^3$ are held in a force-closed manner in the bottom extreme position illustrated. The top pipe $m$ is covered by the auxiliary slide valve $e$.

Under the power piston $b$ the air escapes from the power cylinder, as the steam pipe $a^2$ is connected through the port $p^2$ with the circumferential space $r^1$ in the slide valve and this space with the slide valve in the extreme position shown is in communication with the port $p^4$ and the exhaust A.

The valve chambers $f^1$, $f^2$ of the two main slide valve pistons $e^1$, $e^2$ are also in communication with the exhaust A, the former $f^1$ through the bore $h^1$, the circumferential groove $g^1$ of the auxiliary slide valve $e$ and the venting pipe $o^1$ which leads to the exhaust A. The lower valve chamber $f^2$ is also in communication through the corresponding bore $h^2$ with the circumferential space $g^2$ of the auxiliary slide valve $e^3$. At this moment the said circumferential space is in communication with the pipe $m^1$ leading to the power cylinder $a$, so that the lower valve chamber $f^2$ is connected by way of the power cylinder $a$, in the manner described above, with the exhaust A. Thus the air is removed from the valve chambers $f^1$, $f^2$ by means of the auxiliary slide valves $e$, $e^3$ lying next to them.

On the power piston $b$ moving further downwards in the cylinder $a$ it slides first over the pipe $m^1$ and finally uncovers it (Fig. 2). Steam then flows out of the cylinder $a$ through $m^1$ into the circumferential groove $g^2$ in the auxiliary slide valve $e^3$ and thence through the bore $h^2$ into the valve chamber $f^2$ and at the same time out of the latter into the hollow space in the auxiliary slide valve $e^3$, the steam thus acting both on the driving piston $e^2$ of the slide valve and on the auxiliary slide valve $e^3$. The latter is held in its extreme position by the steam pressure which acts on it, as at this moment exhaust steam through the pipes $n^1$ and $n^3$ is still under the auxiliary slide valve $e^3$. On the other hand the driving piston $e^2$ and the main slide valve $d$ is forced up by the steam, as the piston surface acted on by steam is considerably greater than the end surface of the upper auxiliary slide valve $e$ which is under the same steam pressure. The main slide valve $d$ is thereby caused to move until the inner face of its lower driving member $e^7$ strikes against the auxiliary slide valve $e^3$ (Fig. 2). The clearance of the driving members $e^6$, $e^7$ in the auxiliary slide valves $e$, $e^3$ is made such that the main slide valve $d$ will have passed slightly beyond its middle position when the driving member $e^6$ or $e^7$ strikes against the arrested auxiliary slide valve $e$, $e^3$. Up to this moment the cylinder steam acts continuously on the main slide valve piston $e^2$, bearing against the whole of its surface including the driving member $e^7$, so that the reversal of the main slide valve must in all circumstances take place.

Fig. 2 illustrates this position, in which the controlling piston $d^1$ of the main slide valve has already passed so far over the steam inlet port $p$ that the live steam flowing in through E can pass through the port $p$ into the circumferential groove $r^1$ of the slide valve and thence through the port $p^2$ into the steam pipe $a^2$ and into the power cylinder $a$ under the piston $b$. In this position the upper driving piston $e^1$ has slightly opened the exhaust port $p^3$ so that the spent steam above the power piston $b$ flows through the pipe $a^1$, the port $p^1$, the circumferential space $r$ of the main slide valve and the port $p^3$ to the exhaust. At the same time the spent steam is allowed to escape from the working space $f$ of the auxiliary slide valve $e$ through the pipe $n$ and the duct $n^2$ which communicate with the steam pipe $a^1$. The valve chamber $f^1$ of the driving piston $e^1$ remains during this motion in communication with the exhaust, as already described.

Finally in this position steam is caused to act on the lower end surface of the auxiliary slide valve $e^3$ in the working space $f^3$ of the auxiliary slide valve casing $c^2$, so that the auxiliary slide valve $e^3$ is acted on by the same steam pressure at both its end surfaces.

Accordingly the main slide valve $d$ moves out of the position shown in Fig. 2 further upwards into the position shown in Fig. 2a and carries the auxiliary slide valve $e^3$ along with it in a positive manner. The controlling piston $d^1$ now completely opens the steam inlet port $p$ and the driving piston $e^1$ completely uncovers the exhaust port $p^3$. The upper auxiliary slide valve $e$ covers the air escape pipe $o^1$. Immediately afterwards the circumferential space $g^1$ of the auxiliary slide valve is put in communication with the pipe $m$, so that the valve chamber $f^1$ of the driving piston $e^1$ is again connected by way of the bore $h^1$, the circumferential space $g^1$, the pipe $m$, the power cylinder $a$, the pipe $a^1$, the port $p^1$, the circumferential space $r$ and the port $p^3$ with the exhaust A. The working space $f$ of the auxiliary slide valve $e$ remains in communication with the exhaust by way of $n$, $a^1$, $p^1$, $r$, $p^3$.

The auxiliary slide valve $e^3$ which is positively carried along by the main slide valve $d$ first closes the pipe $m^1$ leading to the circumferential space $g^2$ so that no more steam can flow into the valve chamber $f^2$ of the driving piston $e^2$. Shortly afterwards the circumferential space $g^2$ of the auxiliary slide valve $e^3$ is brought into communication with the venting pipe $o^2$, so that the expanded steam in the valve chamber $f^2$ escapes to A. This slows down the motion of the main slide valve, as at this moment only its kinetic energy acts. Simultaneously, however, with the venting of the valve chamber $f^2$ the auxiliary slide valve $e^3$ is caused to move upwards by the live steam acting on its lower end surface, so that it bears against the main slide valve $d$ and moves it into its upper extreme position under the pressure of the live steam continuously acting on it. The main slide valve and the auxiliary slide valve will then be in the opposite position to that shown in Fig. 1, from which the reverse, downward motion then takes place in the same manner. Before this motion commences the whole of the slide valve is held in its upper extreme position in a force-closed manner by the steam acting in the working space $f^3$ of the auxiliary slide valve $e^3$.

From the above it will be clear that not only completely reliable reversal is ensured through the main slide valve passing beyond its middle position, but also a smooth action of the valve without impact. In the first place the main slide valve which at first only carries one auxiliary slide valve along with it receives a relatively great momentum owing to the large available working surface of the driving piston $e^2$. After the main slide valve $d$ has passed beyond its middle position, that is to say, after the initiation of the reversal, this momentum is first weakened, after which the piston $e^2$ is relieved of pressure. The valve system performs the rest of its travel solely under the pressure of steam acting on the auxiliary slide valve $e^3$, so that a smooth action of the valve without impact is ensured.

Since, as has been already stated, for initiating the slide valve motion, in which one of the auxiliary slide valves takes no part, the entire surface of the driving pistons $e^1$ or $e^2$ is effective, it becomes possible to reduce the diameter of the slide valve without seriously weakening the reversing forces.

In Figs. 3 to 5 the invention is illustrated as applied to a double-acting two cylinder tandem compound engine.

The steam engine is composed of the high pressure cylinder $a^h$ with the power pistons $b^h$ and the piston rod $b^{1h}$ and of the low pressure cylinder $a^n$ with the power piston $b^n$ and the piston rod $b^{1n}$. The two power pistons are connected together by the piston rod $b^{1h}$, so that the engine works in tandem fashion. The valve system consists of the main slide valve $d$ working in the valve casing $c$, and of the two auxiliary slide valves $e$, $e^3$ of smaller cross-section working in the auxiliary slide valve casings $c^1$, $c^2$. The auxiliary slide valves are hollow and are closed at the ends remote from the ends of the main slide valve by threaded plugs $e^8$ and $e^9$, respectively, and are connected with the main slide valve by means of the rods $e^4$, $e^5$ which are screwed into the ends of the main slide valve and are provided with heads $e^6$, $e^7$ forming driving members which are guided in the interiors of the slide valves $e$, $e^3$ in the same manner as in Figs. 1 and 2.

In this case the main slide valve $d$ has besides the driving pistons $e^1$, $e^2$ at its two ends three controlling pistons $d^2$, $d^3$, $d^4$, between which are circumferential spaces $r^2$ and $r^3$. Between the lower controlling piston $d^4$ and the driving piston $e^2$ is a third circumferential space $r^4$.

The main slide valve $d$ is hollow, the hollow space $k$ of which ends at the top in the slots $k^1$ lying between the upper driving piston $e^1$ and the adjacent controlling piston $d^2$ and at the bottom in the slots $k^2$ lying between the bottom controlling piston $d^4$ and the driving piston $e^2$.

The valve casing $c$, as in the previously described example, has a central steam inlet passage E with an inlet port $p$. From the port $p^1$ the steam pipe $a^1$ leads to the upper end, while from the port $p^2$ the steam pipe $a^2$ leads to the bottom end of the high pressure cylinder $a^h$. As in the previous example from the steam pipes $a^1$ and $a^2$ the pipes $n$, $n^1$, with the branch pipes $n^2$, $n^3$ of the smaller cross-section lead to the working spaces $f$, $f^3$ of the auxiliary slide valves $e$, $e^3$. The pipes $m$, $m^1$ are again connected in the same position to the high pressure cylinder $a^h$ and lead to the auxiliary valve casings $c^1$, $c^2$.

The exhaust pipe A with the exhaust port $p^7$ is in this case placed towards the lower end of the valve casing $c$. For providing a connection to the low pressure cylinder $a^n$ there is provided on the one hand the port $p^5$ in the valve casing with the steam pipe $a^5$ and on the other hand the port $p^6$ with the steam pipe $a^6$.

For venting the valve chambers $f^1$ and $f^2$ of the main slide valve driving pistons $e^1$, $e^2$, pipes $o^3$, $o^4$ are provided, which are cross-connected, the former to the steam pipe $a^6$ and the latter to the steam pipe $a^5$ leading to the low pressure cylinder.

In Fig. 3 the engine is shown with its power piston at the beginning of the upward stroke. The live steam entering through E and the port $p$ into the valve casing $c$ flows through the circumferential space $r^3$ of the main slide valve, the port $p^2$ and the steam pipe $a^2$ under the high pressure piston $b^h$ for driving it upwards. The partially expanded steam above the high pressure piston $b^h$ flows through the pipe $a^1$, the port $p^1$ of the valve casing, into the circumferential space $r^2$ of the main slide valve $d$ and thence through the port $p^5$ and the pipe $a^5$ under the low pressure piston $b^n$. The exhaust steam of the low pressure cylinder $a^n$ escapes through the pipe $a^6$, the port $p^6$, the circumferential space $r^4$ of the main slide valve $d$ and the port $p^7$ to the exhaust branch pipe A.

Through the pipe $n^1$ live steam passes under the auxiliary slide valve $e^3$ which holds the entire valve system in a force-closed manner in the top extreme position illustrated in Fig. 3. The two valve chambers $f^1$, $f^2$ of the driving pistons $e^1$, $e^2$ of the main slide valve are filled with intermediate steam, which the former $f^1$ receives through the pipe $m$, the circumferential space $g^1$ of the auxiliary slide valve $e$ and the bore $h^1$, while the lower valve chamber receives the intermediate steam from the steam pipe $a^5$ leading to the low pressure cylinder, through the venting pipe $o^4$ by way of the circumferential space $g^2$ of the lower auxiliary slide valve $e^3$ and the bore $h^2$. Both ends of the main slide valve $d$ are under the same intermediate steam pressure.

The upper auxiliary slide valve $e$ is also acted on by intermediate steam which enters from the steam pipe $a^1$, the pipe $n$ or $n^2$ into the working space $f$ of the main slide valve $e$. Hence the high pressure live steam acting on the lower auxiliary slide valve $e^3$ suffices for holding the valve system in the position illustrated. The power pistons $b^h$ and $b^n$ thus move upwards while the valve system remains in the position shown. On the high pressure piston $b^h$ towards the end of its upward stroke passing over the pipe $m$ and uncovering it, high pressure steam will flow through this pipe $m$, the circumferential space $g^1$ of the auxiliary slide valve $e$ and the bore $h^1$ into the valve chamber $f^1$, so that the upper driving piston $e^1$ of the main slide valve is acted on by high pressure steam. As the surface of this main slide valve is considerably greater than the surface of the auxiliary slide valve $e^3$ which is at the moment also acted on by high pressure steam, the main slide valve is displaced in the manner shown in Fig. 4, until the inner end of its driving member $e^6$ strikes against the auxiliary slide valve $e$. The controlling piston $d^3$ of the main slide valve $d$ will in the meantime have passed over the steam inlet port $p$ downwards, so that the high pressure steam now passes into the circumferential space $r^2$, from which it flows through the port $p^1$ into the steam pipe $a^1$ and through the small branch pipe $a^3$ above the high pressure piston $b^h$ and also through the pipe $n$ and $n^2$ over the auxiliary slide valve $e$.

Through this displacement of the main slide valve $d$ the steam pipe $a^5$ of the low pressure cylinder $a^n$ is opened towards the slots $k^1$ of the main slide valve $d$ and is connected by the hollow space $k$ of the main slide valve and its slots $k^2$ with the exhaust port $p^7$ in the slide valve casing. By this means the valve chamber $f^2$ of the driving piston $e^2$ of the main slide valve is vented through the bore $h^2$, the circumferential space $g^2$ of the auxiliary slide valve $e^3$ and the venting pipe $o^4$.

The exhaust steam of the high pressure cylinder, the so-called intermediate steam, now flows through the pipe $a^2$, the port $p^2$ in the slide valve casing, the circumferential space $r^3$ of the slide valve, and the steam pipe $a^6$ into the low pressure cylinder $a^n$, where it acts upon the power piston $b^n$ from above. From the pipe $a^2$ the lower auxiliary slide valve $e^3$ now also receives intermediate steam through the pipe $n^1$.

As long as the valve system remains in the position shown in Fig. 4 the upper driving piston $e^1$ of the main slide valve is acted upon after the displacement of the main slide valve by intermediate steam which it receives from the high pressure cylinder through the pipe $m$, the circumferential space $g^1$ of the auxiliary slide valve $e$ and the bore $h^1$.

The auxiliary slide valve $e$ is now acted on by high pressure steam, as already stated. As long as the valve chamber $f^1$ of the main slide valve is supplied by the pipe $m$ with high pressure steam from the cylinder $a^h$ the auxiliary slide valve $e$ is held in the position shown in Fig. 4 by the said steam which acts on it from below. As after the movement of the main slide valve $d$ the valve chamber $f^1$ receives intermediate steam, the auxiliary slide valve $e$, which is now acted on from the top by high pressure steam, moves downwards until it bears against the main slide valve $d$. In so doing it covers the pipe $m$ and shortly afterwards opens the pipe $o^3$ towards its circumferential space $g^1$, so that the valve chamber $f^1$ of the driving piston $e^1$ again receives intermediate steam from the steam pipe $a^6$ by way of the venting pipe $o^3$, the circumferential space $g^1$ and the bore $h^1$, after having been momentarily disconnected from the steam pipes.

Since, as described, the valve chamber $f^2$ of the lower driving piston $e^2$ is vented and the lower auxiliary slide valve $e^3$ is acted on only by intermediate steam, the whole slide valve system moves further downwards under the influence of the high pressure steam acting on the upper auxiliary slide valve $e$ and arrives in the bottom extreme position illustrated in Fig. 5. During this motion the venting pipe $o^4$ is covered by the lower auxiliary slide valve $e^3$ and the controlling pipe $m^1$ coming from the high pressure cylinder is connected with the circumferential space $g^2$ of this auxiliary slide valve, so that intermediate steam can also now enter into the valve chamber $f^2$. As, however, the upper larger driving piston $e^1$ is also acted on by intermediate steam, while the upper auxiliary slide valve $e$ is acted on by high pressure steam, the whole slide valve system is held in a force-closed manner in the extreme position shown in Fig. 5. The controlling pipe $m^1$ is now connected with the valve chamber $f^2$ of the lower driving piston, so that when the high pressure piston $b^h$ during its further downward motion uncovers the said pipe $m^1$ after passing over it, high pressure steam flows through this pipe into the valve chamber $f^2$ and acts on the lower driving piston $e^2$, so that the reversing operation commences in the opposite direction.

Figure 6:
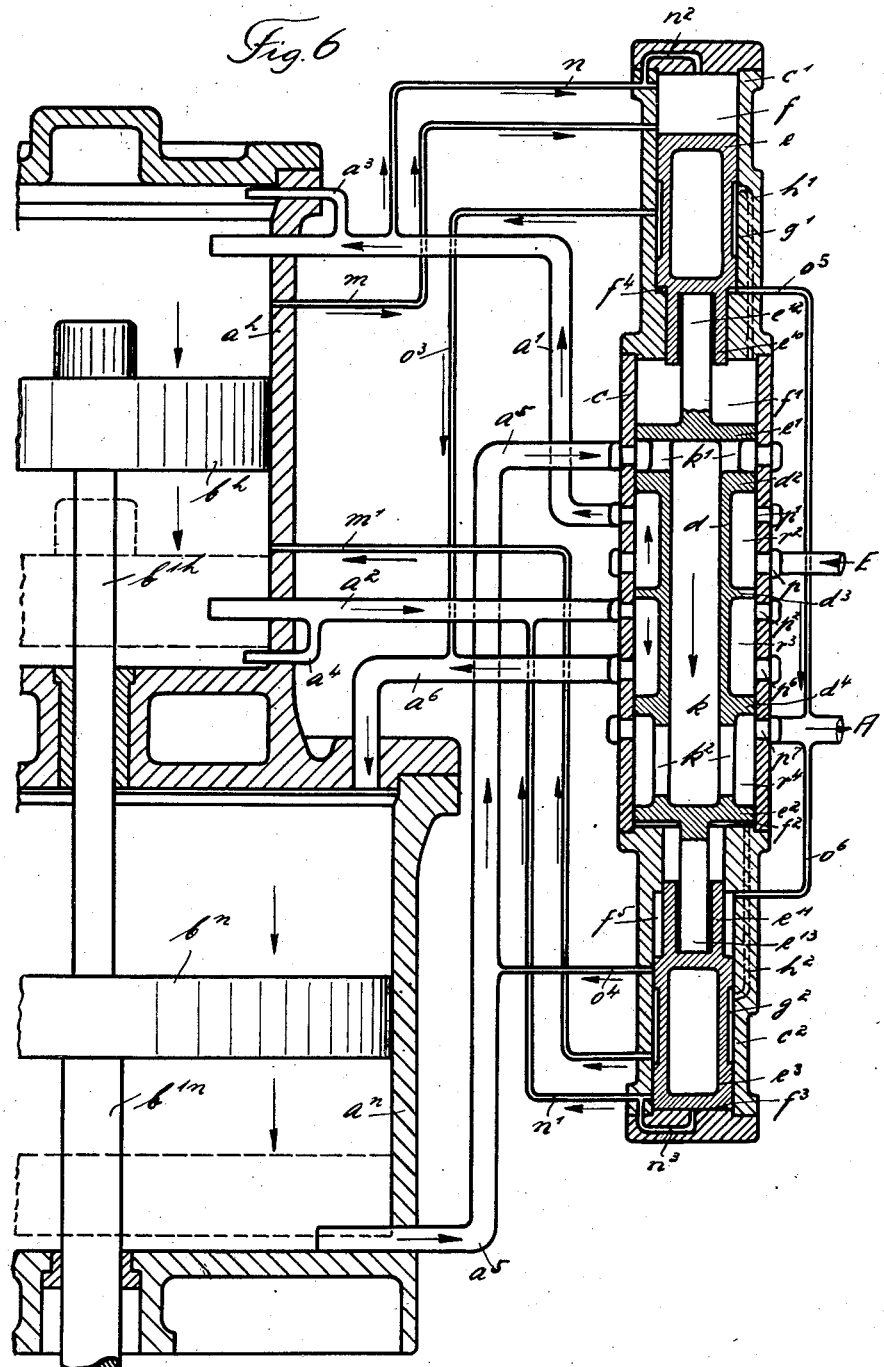
Fig. 6 illustrates a further constructional form of the valve gear according to the invention as applied to a double-acting tandem compound engine, in which the auxiliary slide valves are moved in one direction by steam and in the other by the main slide valve. The valve system is in the lower end position.

The constructional form shown in Figs. 6 and 7 differs from the constructional forms of the invention previously described mainly in this, that the auxiliary slide valves $e$, $e^3$ are so constructed that in one direction they are controlled by blows from the main slide valve, and in the other direction by live steam. This has the advantage, as compared with the constructional forms of Figs. 1 to 5, that the rods $e^4$, $e^5$ screwed into the main slide valve $d$ with the driving members formed by their heads $e^6$, $e^7$ are done away with, since there is always the danger that during operation the thread of the rods may loosen or become destroyed. A further disadvantage of the forms shown in Figs. 1 to 5 is that the putting together with the main slide valve and the auxiliary slide valves is inconvenient and difficult. For this reason according to Figs. 6 and 7 the auxiliary slide valves are constructed as differential pistons in such a manner that with their part of smaller diameter they can move on rods or plungers of the main slide valve.

In this arrangement the auxiliary slide valves $e$, $e^3$ have guiding pistons $e^{10}$, $e^{11}$ of smaller diameter, in the hollow space of which the plungers $e^{12}$, $e^{13}$ of the main slide valve $d$ are capable of sliding. This arrangement results in the forming of working spaces $f^4$, $f^5$ in the auxiliary slide valve casings $c^1$, $c^2$ at the inner ends of the auxiliary slide valves $e$, $e^3$, which are permanently connected by the venting pipes $o^5$, $o^6$ with the exhaust $A$ and are therefore always free from pressure.

In Fig. 6 the entire slide valve system is in the bottom extreme position. The high pressure piston is acted on through $E$, $p$, $p^1$, $a^1$, from the top with live steam and also from $a^1$, through $n$, the auxiliary slide valve $e$ which consequently holds the slide valve system in a force-closed manner in the illustrated extreme position. The low pressure piston receives intermediate steam from above from the high pressure cylinder through $a^2$, $p^2$, $r^3$, $p^6$ and $a^6$. The main slide valve $d$ is acted on at both driving pistons $e^1$, $e^2$ by intermediate steam, as also is the lower auxiliary slide valve $e^3$ in its working space $f^3$. The manner in which the live steam and the intermediate steam is supplied is the same as in the previous constructional example and therefore needs no further explanation.

When during the further downward motion of the power pistons the high pressure piston $b^h$ uncovers the controlling pipe $m^1$ after sliding past it (see Fig. 7), high pressure steam will flow through the said pipe $m^1$, through $g^2$ and $h^2$ into the valve chamber $f^2$ of the lower slide valve piston $e^2$. The main slide valve moves upwards while the auxiliary slide valve $e^3$ remains under the pressure of the high pressure steam acting on it from above in the valve chamber $f^2$, so that high pressure steam continues to act on the slide valve $d$ until its controlling piston $d^3$ slides over the inlet port $p$ and occupies the position shown in Fig. 7. At the same time the upper auxiliary slide valve $e$ will have slid upwards with it and connected the venting pipe $o^3$ with its circumferential space $g^1$, so that after the controlling piston $d^4$ has opened the port $p^6$ to the exhaust the valve chamber $f^1$ of the upper slide valve piston $e^1$ will be vented to the exhaust $A$ by way of $h^1$, $g^1$, $o^3$, steam pipe $a^6$, port $p^6$, and circumferential space $r^4$.

The live steam from $E$ now flows through port $p$, circumferential space $r^3$ and port $p^2$ into the steam pipe $a^2$, and passes under the high pressure piston and also through the pipe $n^1$ under the lower auxiliary slide valve $e^3$, so that the latter, during the further movement of the slide valve system, is pressed against the main slide valve, the entire slide valve system finally reaching its upper extreme position which is shown in Fig. 7a. In this position the two valve chambers $f^1$, $f^2$ of the slide valve pistons receive intermediate steam which also acts on the upper auxiliary slide valve $e$ from above. As, however, the lower auxiliary slide valve $e$ is acted on in its working space $f^3$ by high pressure steam, the entire slide valve system is held in a force-closed manner in the upper extreme position.

In this position the valve chamber $f^1$ of the upper driving piston $e^1$ is connected by way of $h^1$ and $g^1$ with the controlling pipe $m$, so that after this pipe has been swept over and exposed by the high pressure piston $b^h$, high pressure steam can enter the valve chamber $f^1$, when the slide valve commences the same cycle of operations in the reverse direction.

Figure 8:
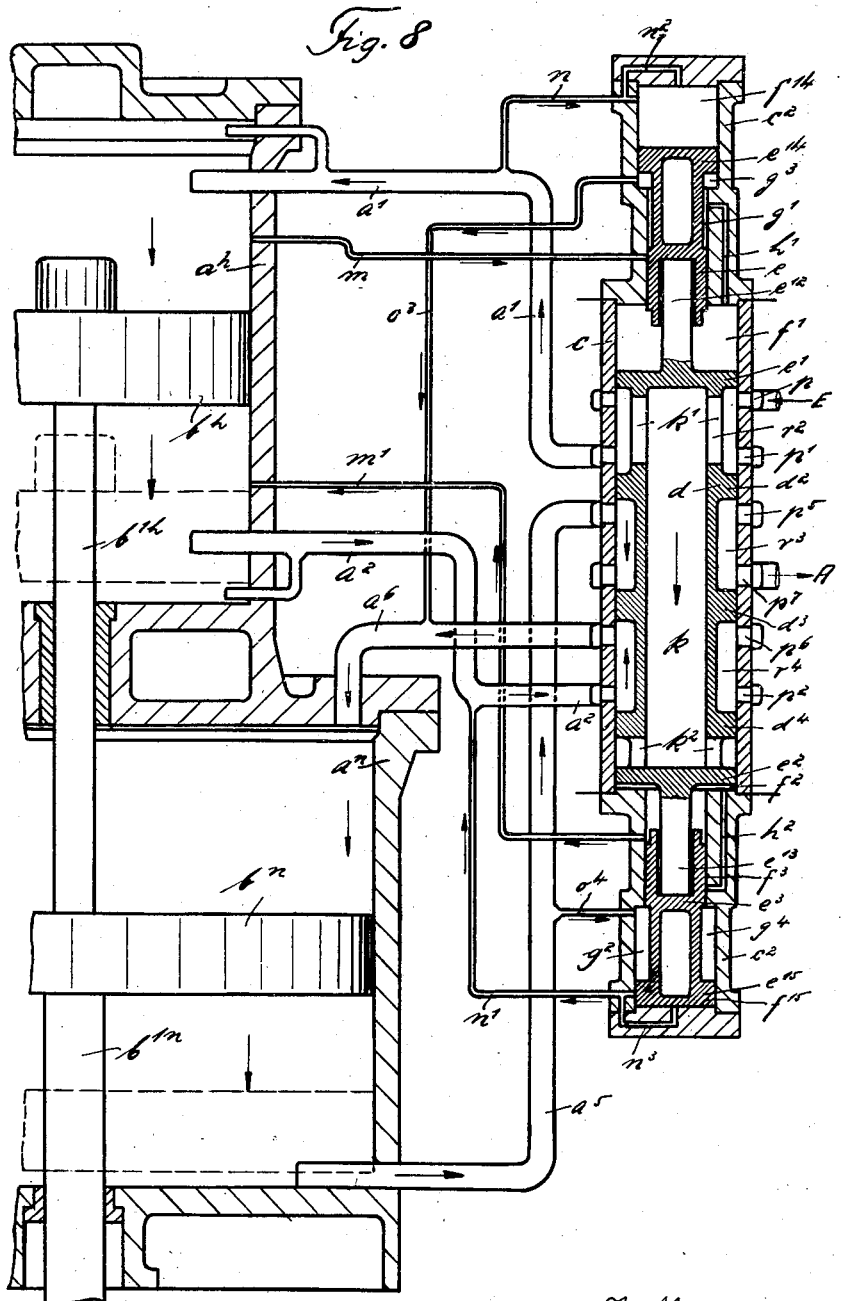
Fig. 8 shows a simplified form of the construction according to Figs. 6 and 7.

Fig. 8 shows a modification of the constructional form of Figs. 6 and 7, which enables the overall length of the auxiliary slide valves and consequently of the whole of the slide-valve arrangement to be considerably shortened. This is effected by the permanently vented working spaces $f^4$ and $f^5$ of the auxiliary slide valves $e$, $e^3$ being removed to the ends of the auxiliary slide valves, where as working spaces $g^3$, $g^4$ they are connected with the circumferential spaces $g^1$, $g^2$ of the auxiliary slide valves. This does away with the venting pipes $o^5$, $o^6$ of the working spaces $f^4$, $f^5$, as shown in Figs. 6 and 7, which results in a further simplification of the entire valve arrangement. In this arrangement the controlling pipes $m$ and $m^1$ open directly into the valve chambers $f^1$, $f^2$, as is shown in Fig. 8 at the bottom as regards the pipe $m^1$. The auxiliary slide valves $e$, $e^3$, which are moved in the same way as in the construction shown in Figs. 6 and 7 are provided at their outer ends with pistons of larger diameter $e^{14}$ and $e^{15}$ and are somewhat reduced in diameter at their inner ends so that in their extreme position, as shown in Fig. 8 in the case of the lower auxiliary slide valve $e^3$, they can uncover the controlling pipes $m$, $m^1$ which in this constructional form communicate directly with the corresponding valve chambers $f^1$, $f^2$ of the driving pistons $e^1$, $e^2$. The working spaces of the auxiliary pistons $e^{14}$, $e^{15}$ are marked $f^{14}$ and $f^{15}$. With their inwardly directed surfaces these pistons work in the spaces $g^3$, $g^4$, which are permanently connected with the circumferential spaces $g^1$, $g^2$ of the auxiliary slide valves. As in the previous example the plungers $e^{12}$, $e^{13}$ of the main slide valve $d$ extend into the auxiliary slide valves. The slide valve casing $c$ and the main slide valve $d$ are also somewhat modified. The steam inlet $E$ with its inlet port $p$ is moved from the middle towards the top and the exhaust $A$ with its port $p^7$ somewhat nearer the middle. The hollow main slide valve $d$ has at its upper end between the driving piston $e^1$ and the top controlling piston slots $k^1$, as in the constructional form of Figs. 3 to 5, and at its lower end between the controlling piston $d^4$ and the driving piston $e^2$ slots $k^2$. The steam pipe $a^2$ with the port $p^2$ is in this case placed lower down, so that the slots $k^2$ of the slide valve can open into this port when the main slide valve moves upwards. The flow of the intermediate steam from the high pressure cylinder $a^h$ to the low pressure cylinder $a^n$ takes place according to the position of the main slide valve by means of the circumferential spaces $r^3$ and $r^4$ of the main slide valve $d$.

Figure 9:
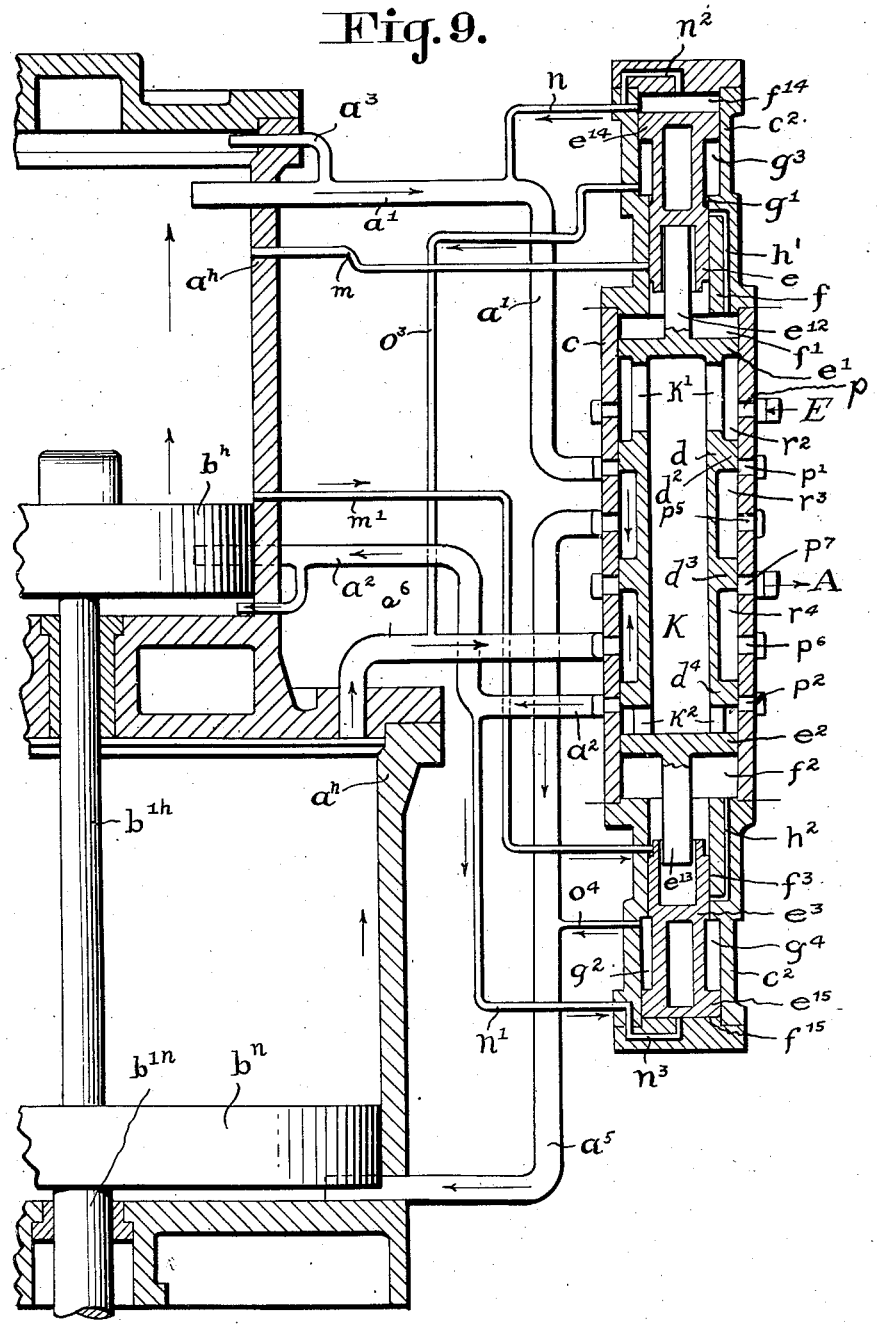
Fig. 9 shows the main valve just after it has passed the middle position and Fig. 10 shows the main valve in its other end position.
Figure 10:
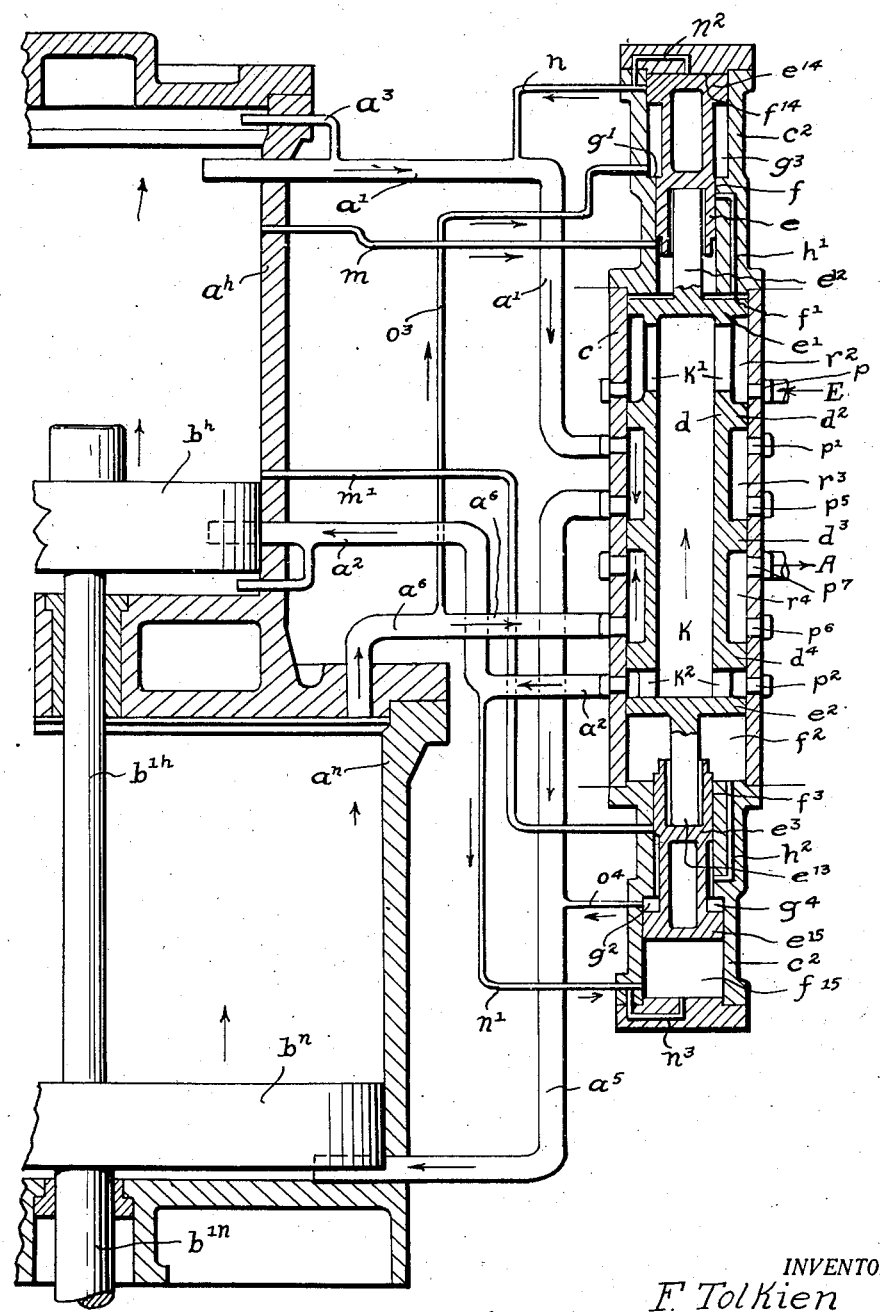

In Figs. 8, 9 and 10 the slide valve system is shown in its bottom extreme position and the set of power pistons of the engine is moving downwards. The auxiliary slide valve $e$ is acted on its piston $e^{14}$ in the working space $f^{14}$ by high pressure steam from the pipe $a^1$ and $n$ and holds the slide valve system in the position shown in a force-closed manner. The valve chambers $f^1$ and $f^2$ of the slide valve pistons $e^1$, $e^2$ have received intermediate steam, the former through the steam pipe $a^6$ by way of the venting pipe $o^3$, the space $g^3$, the circumferential space $g^1$ and the auxiliary slide valve $e$ and the bore $h^1$, the latter, $f^2$, directly through the controlling pipe $m^1$, from the high pressure cylinder $a^h$. The lower auxiliary slide valve $e^3$ is acted on at the bottom on its piston $e^{15}$ in the space $f^{15}$ also by intermediate steam. The space $g^4$ above the said piston $e^{15}$ with the circumferential space $g^2$ of the auxiliary slide valve is vented through the venting pipe $o^4$, the steam pipe $a^5$, the port $p^5$, and the circumferential space $r^3$ to the exhaust A.

After the high pressure piston $b^h$ has slid over the controlling pipe $m^1$ the valve chamber $f^2$ receives high pressure steam through this pipe, so that the lower driving piston $e^3$ is acted on by high pressure steam. The main slide valve $d$ moves upwards while the auxiliary slide valve $e^3$ remains in the position shown in Fig. 8 under the action of the high pressure steam admitted to the valve chamber $f^2$. The upward movement of the slide valve $d$ continues until its controlling piston $d^2$ slides over the port $p'$ and occupies the position shown in Fig. 9. At the same time the upper auxiliary slide valve $e$ has moved upwards with the piston $d$. Live steam from E now flows through the port $p$, the interior of the valve $d$, through the port $p^2$ and the pipe $a^2$ into the high pressure cylinder below the piston $b^h$ and also through the pipe $n'$ under the lower auxiliary piston $e^{15}$, so that the lower auxiliary valve $e^3$ is pressed against the main slide valve and travels with the latter into the upper extreme position. In this position which is shown in Fig. 10, the two valve chambers $f'$, $f^2$ of the slide valve pistons $e'$, $e^2$ receive intermediate steam, the former directly through the pipe $m$ from the high pressure cylinder $a^h$ and the latter through the pipe $a^5$, the venting pipe $o^4$, the space $g^4$ and the bore $h^2$, intermediate steam also acting on the upper auxiliary piston $e^{14}$ from above. The lower auxiliary piston $e^{15}$ however, is acted on from below by high pressure steam passing through the pipe $n'$ and the passage $n^3$ into the working space $f^{14}$, so that the entire slide valve system is held in its upper extreme position.

In this position the intermediate steam passes through the pipe $a'$ into the annular space $r^3$ between the pistons $d^2$ and $d^3$ through the pipe $a^5$ into the low pressure cylinder $a^n$ below the piston $b^n$. The valve chamber $f'$ of the upper driving piston $e'$ is connected directly to the controlling pipe $m$ so that after this pipe has been swept over by the piston $b^h$ and exposed to the high pressure steam below the piston, high pressure steam enters the space $f'$ and the same cycle of operations commences in the reverse direction.

What I claim is:

1. In a double-acting reciprocating engine, the combination of a power cylinder and a piston movable therein with a main slide valve casing having inlet and exhaust ports therein for admitting driving fluid to and exhausting driving fluid from the casing, cylinder conduits in open communication with the cylinder and main slide valve casing, a main slide valve having driving pistons and movable in said main slide valve casing for establishing communication alternately between said cylinder conduits and the inlet and exhaust ports, to control the admission to and exhaust of driving fluid from the engine cylinder, auxiliary valve casings in open communication with said main slide valve casing, said auxiliary valve casings having a smaller cross-section than that of the main slide valve casing and having venting outlets therein, driving fluid supply conduits connected to the cylinder and auxiliary valve casings for supplying driving fluid to the said casings from the cylinder, connecting conduits in open communication with the main and auxiliary casings, auxiliary valves movable in said auxiliary valve casings with respect to the main slide valve for controlling the supply of driving fluid to the driving pistons of the main slide valve through said connecting conduits to reverse the main slide valve and for controlling the exhaust of driving fluid through said venting outlets and conduits in open communication with the cylinder conduits and the auxiliary valve casings for supplying driving fluid to the auxiliary valves for reversing the auxiliary valves to shut off the supply of driving fluid to the driving pistons after the main slide valve has moved past its middle position, said venting outlets in the auxiliary valve casing being located therein so as to be closed by the auxiliary valves only in the extreme outer position thereof, whereby the operative driving piston is subject to the exhaust pressure after the main slide valve has passed its middle position.

2. In a double-acting reciprocating engine, the combination as set forth in claim 1, in which the auxiliary valves have a circumferential space therein in permanent open communication with the connecting conduits, the driving fluid supply conduits being connected to the auxiliary valve casings so as to be in open communication with the said connecting conduits only when the auxiliary valves are in the vicinity of their extreme outer position.

3. A slide valve gear as set forth in claim 1, in which the ends of the auxiliary slide valves adjacent the main slide valve are adapted to bear against the ends of the main slide valve to maintain the latter in its respective end positions and during the movement of the main slide valve, the auxiliary slide valve regulating the admission of driving fluid to the operative driving piston being exposed to the driving fluid acting on the operative driving piston and held in the extreme outer position by the difference in the pressure acting on the two sides of the valve until the main slide valve has passed beyond its middle position.

4. A fluid actuated valve for double-acting reciprocating engines as set forth in claim 1, in which the auxiliary slide valves are hollow and the main slide valve has driving members on the ends thereof movable in the interiors of the auxiliary slide valves, said driving members having heads thereon adapted to engage the auxiliary slide valves for limiting the relative movement of the main and auxiliary slide valves.

5. A fluid actuated valve for double-acting reciprocating engines as set forth in claim 1, in which the conduits in open communication with the cylinder conduits are in open communication with the ends of the auxiliary valve casings.

FRITZ TOLKIEN.